United States Patent Office 3,661,822
Patented May 9, 1972

3,661,822
STABILIZATION OF EPDM RUBBER WITH
EPOXIDE-SULFIDE MIXTURE
Charles W. Lee, Towaco, N.J., assignor to
Uniroyal, Inc., New York, N.Y.
No Drawing. Filed Apr. 30, 1970, Ser. No. 33,479
Int. Cl. C08f 29/10, 45/58
U.S. Cl. 260—23.5                                    18 Claims

ABSTRACT OF THE DISCLOSURE

Stabilization of ethylene-propylene-non - conjugated diene terpolymer (EPDM) elastomers against heat aging by incorporation of an epoxide and an organic sulfide (e.g., an olefin oxide and n-octyl disulfide).

CROSS REFERENCE TO COPENDING APPLICATION

Commonly assigned copending application Ser. No. 33,480 of Edward M. Bevilacqua, filed of even date herewith, deals with ternary synergistic stabilizing combinations for EPDM elastomers, based on (a) a phenol, (b) an organic sulfide or thioester, and (c) an epoxide or phosphite ester.

BACKGROUND OF THE INVENTION (1) Field of the invention

This invention relates to a composition comprising an EPDM elastomer containing a synergistic antioxidant combination.

(2) Description of prior art

British Pat. 917,100 to Du Pont shows stabilization of polyolefins (obtained by polymerization of substituted terminally unsaturated olefins) to thermal and oxidative degradation by the addition of an epoxide resin, having the structural element

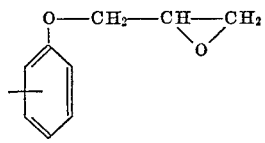

and β-thiodipropionate antioxidants having the formula R'OOCCH$_2$CH$_2$S—X wherein R' is an alkyl, aryl or a cycloalkyl radical and X is a carboxyethiaethyl, carboxyethiaethdithiaethyl, carboxyethiaisobutyl or carboxythiapropyl radical. However there is in this patent nothing suggesting the instant invention.

SUMMARY OF THE INVENTION

The invention relates to the stabilization against heat aging of unsaturated EPDM elastomers. Unsaturated EPDM elastomers are particularly difficult materials to stabilize with rsepect to heat aging. Thus, epoxides such as epoxidized C$_{12-18}$ alpha-olefinic hydrocarbons or epoxy resins of the diglycidyl ether type of bisphenol A, or epoxidized soy bean oil, do not prevent oxidative deterioration of these unsaturated polymers upon heat aging. Similarly, organic mono- or disulfides of the diaryl-, aralkyl, dialkyl- and benzylaryl-type do not prevent the unsaturated EPDM polymer from degrading, as a result of exposure to heat. Individually, the aforementioned epoxides or sulfides therefore are not effective stabilizers in unsaturated EPDM upon heat aging.

The invention is based on the surprising discovery that, contrary to what would be expected from the effects of the epoxide or the organic sulfide used individually, when an epoxide and an organic sulfide are incorporated in combination in unsaturated EPDM rubbers there is remarkable synergism rendering the polymers resistant to degradative changes upon heating.

DETAILS OF THE INVENTION

The EPDM employed in the invention is a conventional material, and may be defined as a copolymer of at least two different alpha-monoolefins with at least one copolymerizable polyene (see U.S. Pat. 3,361,691, Mazzeo, Jan. 2, 1968, especially col. 1, line 37 to col. 2, line 3; also U.S. Pat. 3,102,104, Brice, Aug. 27, 1963 and the references cited therein). Usually one of the alpha-monoolefins is ethylene and the other is ordinarily propylene, although other pairs of alpha-monoolefins may be used. Usually the copolymerizable polyene is a non-conjugated diene, whether open chain as in 1,4-hexadiene or cyclic (especially bridged ring) as in dicyclopentadiene, ethylidene norbornene, methylene norbornene, cycloocetadiene, tetrahydroindene, etc. These rubbers are known as "EPDM" (see U.S. Pat. 3,419,639, Gentile, Dec. 31, 1968 and the references cited therein) and frequently contain from about 1 to about 20% by weight of the non-conjugated diene. Ethylene-propylene-dicyclopentadiene terpolymer and ethylene-propylene-ethylidene norbornene terpolymer are especially preferred.

Considering now the epoxides and organic sulfides employed in synergistic combination to stabilize the EPDM against oxidative degration at elevated temperature in accordance with the invention, and referring particularly to the expoxides, these usually fall into one of the following categories:

(i) epoxidized soybean oil;
(ii) epoxidized higher fatty acid ester;
(iii) an epoxide of a straight chain alpha-olefin;
(iv) an epoxide of a diolefin homopolymer; and
(v) diglycidyl ether type of bisphenol A.

Various epoxidized soybean oils are available commercially, as represented by such products as Paraplex G-60, G-61 and G-62, and Flexol EPO. Epoxidized higher fatty acid esters are typified by esters of fatty acids having 10 to 30 carbons atoms in the chain with alkanols having up to 10 carbon atoms (e.g., methyl alcohol, octyl alcohol, decyl alcohol, and the like). They are represented by such commercial materials as Drapex 3.2 (octyl epoxy stearate having a molecular weight of 410) or Monoplex-71 (an epoxidized oleate ester with an average molecular weight of 380). The epoxy alpha-olefins are usually made by treating a straight chain alpha-olefin with oxygen under pressure in the presence of a catalyst such as molybdenum carbonyl or molybdenum naphthenate. An important epoxide of a diolefin homopolymer is epoxidized polybutadiene, as represented by the commercial material known as "Oxiron" containing 10% epoxy, iodine number 185, viscosity 1800 poises at 25° C. (see U.S. Pat. 2,829,135). Epoxide contents in such materials frequently run from 2% to about 15%. The epoxy resins which are diglycidyl ether types of bisphenol A (4,4'-isopropylidenediphenol) are usually made in known manner by reacting bisphenol A with epichlorohydrin. Commercial examples are Epon 820, Epon 826, Epon 828, Epon 830 and similar types which usually have an epoxy equivalent of 125 to 4000 and a viscosity in the range of from 100 to 59,000 centipoises at 25° C.

Turning now to the second component of the stabilizer combination employed along with the epoxide, namely the organic sulfide, this is represented by the organic sulfides and disulfides including those having the general formula:

R—A—R' where A is a diradical such —S—; —S—S—;

—S—R''—S— and R and R' can be alike or different and are radicals such as alkyl, cycloalkyl, aryl, heterocyclic and hydrocarbon substituted analogues thereof (e.g. aralkyl, alkaryl), R'' in turn may be exemplified by an alkylene, arylene, alkylenearylene, cycloalkylene or heterocyclic diradical.

Representative examples of alkyl sulfides are; butyl sulfide, pentyl sulfide, hexyl sulfide, heptyl sulfide, octyl sulfide, decyl sulfide, dodecyl sulfide, tetradecyl sulfide, hexadecyl sulfide, octadecyl sulfide, eicosyl sulfide and hydrocarbon substituted analogues thereof such as benzyl sulfide, phenethyl sulfide, phenylpropyl sulfide and phenylbutyl sulfide.

Representative examples of cycloalkyl sulfides are cyclobutyl sulfide, cyclopentyl sulfide, cyclohexyl sulfide and cyclooctyl sulfide.

Representative examples of alkyl aryl sulfides are benzyl phenyl sulfide, phenethyl sulfide, ethyl phenyl sulfide, butyl phenyl sulfide, hexyl phenyl sulfide and hydrocarbon substituted analogues thereof.

Representative examples of aryl sulfides are phenyl sulfide, naphthyl sulfide and hydrocarbon substituted analogues thereof.

Representative examples of heterocyclic sulfides are thienyl sulfide, thenyl sulfide, furyl sulfide, furfuryl sulfide, pyrrolyl sulfide, pyridyl sulfide, pyranyl sulfide, morpholinyl sulfide, thiazolyl sulfide, pyrazolyl sulfide, pyrimidyl sulfide, pyrazinyl sulfide, pyridazinyl sulfide, benzothiazolyl sulfide and hydrocarbon substituted anaolgues thereof.

Representative examples of the bissulfides (R—S—R''—S—R')

are 1,2-bis(phenylthio) ethane, bis(phenylthio) methane, 1,3-bis(phenylthio) propane, 2,2'-bis(phenylthio) propane, 1,4-bis(phenylthio) butane, 1,5-bis(phenylthio) pentane and hydrocarbon substituted analogues thereof.

Representative examples of the disulfides are dibutyl disulfide, dipentyl disulfide, dihexyl disulfide, dioctyl disulfide, didecyl disulfide, didodecyl disulfide, ditetradecyl disulfide, dihexadecyl disulfide, dioctadecyl disulfide, dieicosyl disulfide and hydrocarbon substituted analogues thereof such as benzyl disulfide, phenethyl disulfide, phenylpropyl disulfide, phenylbutyl disulfide.

Representative examples of heterocyclic disulfides are thienyl disulfide, thenyl disulfide, furyl disulfide, furfuryl disulfide, pyrrolyl disulfide, pyridyl disulfide, pyranyl disulfide, morpholinyl disulfide, thiazolyl disulfide, pyrazolyl disulfide, pyrimidinyl disulfide, pyrazinyl disulfide, pyridazinyl disulfide, benzothiazolyl disulfide and hydrocarbon substituted analogues thereof.

Representative examples of aryl disulfides are phenyl disulfide, naphthyl disulfide and hydrocarbon substituted analogues thereof.

Representative examples of bis disulfides are 1,2-bis (phenyldithio) ethane, bis(phenyldithio) methane, 1,3-bis(phenyldithio) propane, 2,2'-bis(phenyldithio) propane, 1,4-bis(phenyldithio) butane, 1,5-bis(phenyldithio) pentane and hydrocarbon substituted analogues thereof.

For purposes of the invention the epoxide and organic sulfide are employed in amount effective to impart the desired degree of stabilization to the EPDM. Usually the total quantity of epoxide plus sulfide will be at least about 0.75 phr. (parts per hundred of rubber), and while there is no critical upper limit on the amount of stabilizing materials, it will be found for most purposes that there is no proportionate added advantage in using more than about 3 or 4 parts. In many cases the amount of epoxide will be from about 0.3 to about 3 parts, preferably 0.5 to 2.5 parts, while the amount of organic sulfide will be from about 0.2 to 1 part, preferably 0.25 to 0.7 part, phr.

The compositions of the invention may further include any other suitable desired compounding ingredients, such as vulcanizing agents, accelerators, activators, retarders, pigments or fillers (e.g. carbon black, silica, etc.) processing aids, extender oils, and other conventional ingredients.

The invention is applicable to stabilization or prevention of oxidative deterioration in the unvulcanized polymer. Thus, the invention protects the uncured rubber during the period between completion of the polymerization reaction in which the polymer is manufactured, and the recover of the polymer, as well as during washing, drying at elevated temperatures, packaging, shipment and storage of the polymer. The stabilizer system of the invention also protects the polymer during the compounding, processing and/or fabrication operations associated with the manufacture of such articles as tires, belts, hose, footwear, coated fabrics, and the like.

The synergistic stabilizer composition consisting of the described epoxide and organic sulfide may be added to the EPDM polymer at any time at which it is desired to protect the polymer from the adverse effects of aging. Thus, the epoxide and organic sulfide are suitably added to the solution or cement, in which the EPDM is prepared, at the conclusion of the polymerization reaction and prior to the steps of recovery and purification of the EPDM. The epoxide and organic sulfide are conveniently added in the form of a solution in an organic solvent, suitably the same solvent as the solvent used in the polymerization reaction, e.g., hexane, after the cement is washed. The EPDM is thereafter recovered from the cement in the usual manner, that is, unreacted monomers are removed and catalyst is deactiviated. Solvent removal and washing of the polymer, usully with an aqueous medium, are followed by drying of the EPDM, usually at elevated temperature. The presently employed epoxides and organic sulfide materials are substantially hydrocarbon-soluble, thus facilitating their introduction into the EPDM cement in the form of a solution in hexane or the like. Also, the present epoxides and preferred sulfides have a sufficiently high molecular weight and a sufficiently high boiling point so that they do not boil away at temperatures normally encounted in EPDM recovery and processing.

The stabilized composition of the invention is remarkable for its ability to resist breakdown of molecular weight when subjected to oxidative heat aging. Breakdown of molecular weight is evidenced by discoloration of the polymer and development of tackiness as well as degradation of other physical properties. The binary synergistic stabilizing combination of the invention is therefore particularly useful for stabilization of EPDM to be used in light-colored end products where resistance to discoloration is important. In general, those compositions which display the greatest resistance to absorption of oxygen in the aging test described in the working examples below will show the least discoloration and development of tackiness.

The following examples, in which all quantities are expressed by weight, will serve to illustrate the practice of the invention in more detail.

Example I

This example illustrates the synergistic effect of combining epoxides and organic sulfides in unsaturated EPDM as determined by oxygen absorption. All samples in this example are prepared separately from a single drum of washed ethylene-propylene-dicyclopentadiene terpolymer rubber cement containing no other stabilizer. The polymer has 62% by weight of ethylene, an iodine number of 11.6, zero percent gel in cyclohexane, and an intrinsic viscosity in tetralin at 135° C. of 2.2. The epoxide employed in this example is a commercial preparation of material of the formula

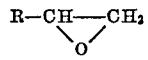

where R is a $C_{13-16}$ straight chain alkyl, known as Neodox 1518, which has an oxirane value of 6.2%, an iodine value of 5.4, an acid value of 0.1, a saponification value of 4.2, a viscosity of 6.0 centipoises at 25° C., a specific gravity of 0.84, a flash point of 164° C., a boiling point of 105–150° C. at 1 mm. of mercury, and a molecular weight of 245. As the second component of the synergistic stabilizing composition, various organic sulfides are employed as shown in Table I. This epoxide and sulfide are incorporated into the terpolymer, in the amounts shown in Table I, by addition in benzene or hexane solution to the terpolymer cement. The resulting solution is poured into rectangular glass dishes (8 inches wide and 12 inches long) and the solvent allowed to evaporate over night at room temperature. The resulting polymer films are then individually wrapped on glass tubes (1 inch in diameter and 10 inches long), given a final 5 minute drying in vacuum at 150° C. and then tested for oxygen absorption immediately thereafter. The figure tabulated in Table I as $t_{20}$ is the time in minutes to absorb 20 ml. of oxygen per gram of polymer at 150° C. in an atmosphere of oxygen, at atmospheric pressure, and is a direct measure of stability because it measures the resistance of the polymer composition to oxidation.

TABLE I.—STABILIZATION OF EPDM WITH EPOXIDE AND ORGANIC SULFIDES

| Sample No. | Additives (phr.) | | $t_{20}$ |
|---|---|---|---|
| | Epoxide | Sulfide | |
| I-A | 1.25 | Bis-(2-benzothiazyl) disulfide, MBTS (0.625). | 288 |
| I-B | 1.25 | n-Octyl disulfide (0.625) | >420 |
| I-C | 1.25 | n-Dodecyl sulfide (0.625) | 260 |
| I-D | 0.51 | Benzyl disulfide (0.28) | 282 |
| I-E | 1.25 | | 42 |
| I-F | 0.51 | | 39 |
| I-G | | Bis-(2-benzothiazyl) disulfide MBTS (0.625). | 72 |
| I-H | | n-Octyl disulfide (0.625) | 67 |
| I-I | | n-Dodecyl sulfide (0.625) | 60 |
| I-J | | Benzyl disulfide (0.28) | 99 |
| I-K | | | 32 |

It will be noted from the absorption times tabulated in Table I ($t_{20}$), that the use of both epoxide and organic sulfide together in the EPDM imparts a remarkable degree of protection against oxidative deterioration at elevated temperature (samples I-A to I-D) as evidenced by the high absorption times, whereas the epoxide alone (samples I-E, I-F) and the organic sulfides alone (samples I-G to I-J) are ineffective as antioxidants as evidenced by the low absorption times. This clearly established finding of synergism of antioxidant combinations in the unsaturated EPDM is indeed extraordinary.

EXAMPLE II

The procedure of Example I is repeated with the same EPDM, using diglycidyl ether bisphenol-A as the epoxy resin, and using various sulfides, in the amounts shown in Table II. The epoxy resin is a commercial material known as Epon 828, a liquid product made by reacting epichlorohydrin and bisphenol A, having an epoxy equivalent of 185 to 192, a viscosity of 10,000–16,000 centipoises at 25° C., and a molecular weight of approximately 380.

TABLE II.—STABILIZATION OF EPDM WITH EPOXIDE AND ORGANIC SULFIDES

| Sample No. | Additives (phr.) | | $t_{20}$ |
|---|---|---|---|
| | Epoxide | Sulfide | |
| II-A | 2.5 | Benzyl phenyl sulfide (0.625) | 130 |
| II-B | 2.5 | Benzyl disulfide (0.625) | >390 |
| II-C | 2.5 | 1,2-bis(phenylthio) ethane | >420 |
| II-D | 2.5 | n-Dodecyl sulfide (0.625) | >390 |
| II-E | 2.5 | Bis-(2-benzothiazyl) disulfide MBTS (0.28). | 380 |
| II-F | 2.5 | | 43 |
| II-G | | Bis-(2-benzothiazyl) disulfide MBTS (0.625). | 72 |
| II-H | | Benzyl phenyl sulfide (0.625) | 40 |
| II-I | | Benzyl disulfide (0.625) | 99 |
| II-J | | 1,2-bis(phenylthio) ethane | 27 |
| II-K | | n-Dodecyl sulfide (0.625) | 60 |
| II-L | | | 27 |

It will be seen from Table II that the epoxy resin by itself, and the various sulfides by themselves, have either no appreciable or lesser effects on stability (sample II-F to II-K), but in combination with each other (samples II-A-II-E) there is a substantial synergistic interaction.

Example III

Table III illustrates the practice of the invention with an epoxidized soy bean oil as the epoxide, using the same EPDM as in Example I, and various organic sulfides. The epoxidized soy bean oil is a commercial material, Paraplex G-62, having a molecular weight of 1000, a density of 0.999, a freezing point of 2° C., and a viscosity of 3–4 poises at 25° C.

TABLE III.—STABILIZATION OF EDPM WITH EXPOXIDE AND ORGANIC SULFIDES

| Sample No. | Epoxide (phr.) | Sulfide (phr.) | $t_{20}$ |
|---|---|---|---|
| III-A | 1.25 | n-Octyl disulfide (0.625) | 205 |
| III-B | 2.50 | | 51 |
| III-C | | n-Octyl disulfide (0.625) | 67 |
| III-D | | | 27 |
| III-E | 1.0 | Benzyl disulfide (1.0) | 270 |
| III-F | | Benzyl disulfide (1.0) | 125 |

Inspection of Table III reveals, again, the remarkable combined antioxidant effect of the epoxide and sulfide when used together in the EPDM (samples III-A and III-E).

Having thus described my invention, what I claim and desire to protect by Letters Patent is:

1. A composition comprising 100 parts by weight of an ethylene-propylene-non-conjugated diene terpolymer elastomer stabilized against deterioration by from 0.75 to 4 parts of a binary synergistic mixture of (A) and (B), the said (A) being an epoxide selected from the group consisting of:
    (i) epoxidized soybean oil,
    (ii) epoxidized esters of fatty acids having 10 to 30 carbon atoms in the chain with alkanols having up to 10 carbon atoms,
    (iii) epoxidized straight chain alpha-olefins,
    (iv) epoxidized polybutadiene, and
    (v) diglycidyl ether resin of 4,4′-isopropylidenediphenol and the said (B) being an organic sulfide having the formula:

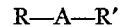

where A is a diradical selected from the group consisting of —S—, —S—S—, and —S—R″—S— wherein R and R′ can be the same or different and are selected from the group consisting of alkyl, cycloalkyl, aryl, aralkyl, alkaryl and heterocyclic radicals, and R″ is selected from the group consisting of alkylene, arylene, alkylenearylene, cycloalkylene and heterocyclic diradicals.

2. A composition as in claim 1 containing from 0.3 to 3 parts of (A) and from 0.2 to 1 part of (B).
3. A composition as in claim 2 in which (A) is (i).
4. A composition as in claim 2 in which (A) is (iii).
5. A composition as in claim 2 in which (A) is (v).

6. A composition as in claim 2 in which (B) is bis-(2-benzothiazyl) disulfide.

7. A composition as in claim 2 in which (B) is n-octyl disulfide.

8. A composition as in claim 2 in which (B) is n-dodecyl sulfide.

9. A composition as in claim 2 in which (B) is benzyl disulfide.

10. A composition as in claim 2 in which (B) is benzyl phenyl sulfide.

11. A composition as in claim 2 in which (B) is 1,2-bis(phenylthio) ethane.

12. A composition as in claim 2 in which (A) is (iii) and (B) is n-octyl disulfide.

13. A composition as in claim 2 in which (A) is (v) and (B) is benzyl disulfide.

14. A composition as in claim 2 in which (A) is (v) and (B) is 1,2-bis (phenylthio) ethane.

15. A composition as in claim 2 in which (A) is (i) and (B) is benzyl disulfide.

16. A composition as in claim 2 in which (A) is (v) and (B) is n-dodecyl sulfide.

17. A composition as in claim 2 in which the non-conjugated diene is dicyclopentadiene.

18. A composition as in claim 2 in which the non-conjugated diene is ethylidene norbornene.

References Cited

UNITED STATES PATENTS

| | | | |
|---|---|---|---|
| 2,370,756 | 3/1945 | Sibley | 260—45.7 UX |
| 2,967,847 | 1/1961 | Hawkins et al. | 260—45.7 X |
| 3,175,992 | 3/1965 | Anderson | 260—45.7 |
| 3,361,691 | 1/1968 | Mazzeo | 260—23.7 |
| 3,534,007 | 10/1970 | Hoffman et al. | 260—80.78 |

FOREIGN PATENTS 917,100  1/1963  Great Britain.

DONALD E. CZAJA, Primary Examiner

D. J. BARRACK, Assistant Examiner

U.S. Cl. X.R.

260—45.7 S, 45.8 A, 836, 837 R